A. B. HURLEY.
EDUCATIONAL DEVICE.
APPLICATION FILED OCT. 9, 1920.
1,394,305.
Patented Oct. 18, 1921.
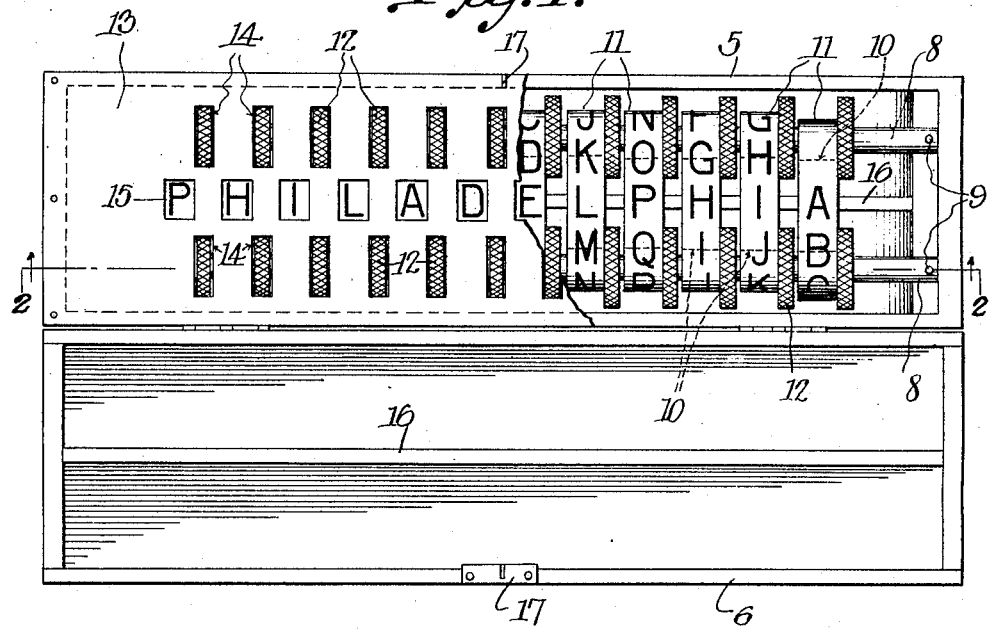
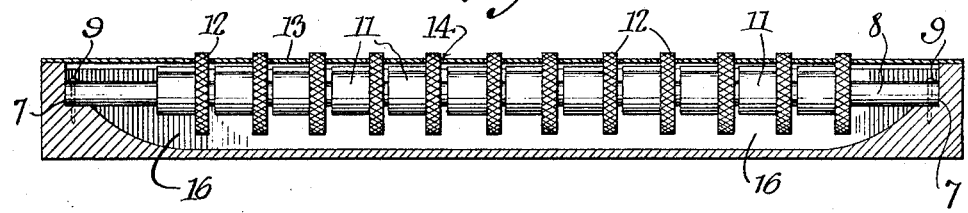
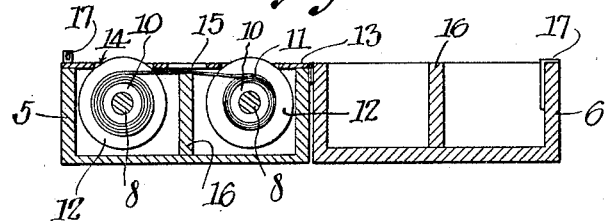
Inventor:
Albert B. Hurley,
By Raymond T. Croggon
Attorney

UNITED STATES PATENT OFFICE.

ALBERT B. HURLEY, OF WILMINGTON, DELAWARE, ASSIGNOR TO L. W. HURLEY, OF SEAFORD, DELAWARE.

EDUCATIONAL DEVICE.

1,394,305. Specification of Letters Patent. Patented Oct. 18, 1921.

Application filed October 9, 1920. Serial No. 415,815.

*To all whom it may concern:*

Be it known that I, ALBERT B. HURLEY, a citizen of the United States, and a resident of Wilmington, in the county of New Castle and State of Delaware, have invented a new and useful Educational Device, of which the following is a specification.

My invention is an educational device for children and its all important object is to provide a device of this nature which will be instrumental in teaching spelling to children.

Further, the invention provides a combined speller and pencil box or scholar's companion wherein any combination of letters of the alphabet may be brought into view to spell any desired word.

It is also an object of the invention to provide a combined spelling teaching device and pencil box or scholar's companion employing a pair of complementary box sections in one of which the spelling device is mounted and the other serving to inclose the projecting parts of the spelling teaching device when the box sections are closed.

Still another object of my invention is to provide an educational device that may be readily operated by the average child and which will rapidly teach the child the study of spelling.

The invention further contemplates a spelling teaching device which is of comparative simplicity and at the same time practical in use and may be manufactured and sold at a nominal cost.

With the preceding and other objects and advantages in mind, the invention consists in the novel combination of elements, constructions and arrangement of parts and operations which will be fully set forth in the following description, claimed and illustrated in the accompanying drawing; wherein:

Figure 1 is a plan view of a combined speller and pencil box constructed in accordance with my invention, parts being broken away;

Fig. 2 is a longitudinal sectional view taken on line 2—2 of Fig. 1; and

Fig. 3 is a transverse sectional view of the device.

Referring to the drawing in detail wherein similar characters of reference denote corresponding parts throughout the several views, the numerals 5 and 6 designate a pair of complementary box sections hingedly connected together. Preferably these box sections are constructed from blocks having their upper faces grooved or chamfered.

The end walls and the bottom of the section 5 at its ends are of a relatively great thickness as is clearly shown in Fig. 2, and the inner faces of these end walls are provided with pairs of recesses 7 disposed in longitudinal alinement. Extending longitudinally within this section 5 and having their ends engaged in the recesses 7 is a pair of rods or shafts 8, these ends being secured in the recesses 7 by dowel pins or other fastenings 9.

Rotatably mounted on the rods 8 are pairs of transversely alined rollers 10, and for each pair of these rollers and adapted to be wound from one to the other is a tape or ribbon 11, each of which having the characters of the alphabet printed or otherwise inscribed thereon. These tapes or ribbons 11 are usually formed from paper, but if desired, they may be made from fabric. Each of the rollers 10 is formed at one end with a disk or finger engaging element 12, each of which is provided with a knurled surface.

Secured to the upper face of the section 5 is a wall or cover 13 provided with pairs of slots 14 coinciding with the disks or operating elements 12 and through which parts of these operating elements project to be engaged by the operator's fingers to feed the tapes from one roller to the other. The wall or cover 13 is also provided with a series of longitudinally alined sight openings 15 located between the rollers 10 and to one side of the disks or operating elements 12. A vertically disposed partition 16 is disposed longitudinally within the section 5 between the rollers 10 and has its upper edge flush with the upper edge of this section and is below the sight openings 15 and engages the tapes or ribbons 11 to hold the same in close proximity to the under face of the wall or closure 13 so that the characters thereon will be readily viewed.

A conventional latch, designated at 17, is provided for locking the box sections together.

From the disclosure it will be obvious that upon rotation of the desired disks 12, any combination of letters may be disposed in the sight openings. As an illustration, the letters spelling "Philadelphia" are disposed in the sight openings. In spelling words not necessitating the entire number of tapes those not being used will register blank.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. In an educational device a hollow body, a cover secured to the upper face thereof and provided with pairs of transversely disposed slots and also provided with sight openings between the slots, a pair of parallel rods arranged longitudinally within the body, pairs of rollers rotatable on the rods, rotatable operating elements fixed to the rollers and projecting through the slots, and a tape for each pair of rollers to be wound from one to the other and provided with indicia to be brought into registration in the sight openings.

2. A spelling device including a hollow base provided with recesses at its opposite ends, a pair of rods arranged longitudinally within the base and having its ends secured in the recesses, pairs of rotatable elements, a tape engaged with each pair of rollers to be wound from one roller to the other and having characters thereon, a cover secured to the upper face of the base and provided with pairs of slots coinciding with the operating elements and through which the latter project and also provided with sight openings in which any combination of characters are adapted to be exposed.

3. An educational device comprising a casing having end walls of relatively great thickness provided with longitudinally alined recesses in their inner faces, a pair of rods disposed longitudinally within the casing and having their ends secured within the recesses, a plurality of rotatable elements mounted on the rods and including annular finger-engaging elements, tapes extending from the rotatable elements on one shaft to the rotatable elements on the other shaft and capable of being wound from one to the other and having characters thereon, a cover overlying the rotatable elements and having its edges secured to the upper edges of the casing and provided with pairs of transversely alined slots through which the finger engaging elements project and thereby serve to hold the rotatable elements against endwise movement, the cover being also provided with sight openings with which the characters on the tape are adapted to register.

ALBERT B. HURLEY.